United States Patent [19]
Cannon et al.

[11] Patent Number: 5,213,594
[45] Date of Patent: May 25, 1993

[54] CONTROLLING SOLVENT VAPORS IN DRY CLEANING APPARATUS

[75] Inventors: Thomas E. Cannon, Minneapolis; Stephen L. Harris, Anoka; Robert J. Kendig, Coon Rapids; Ward D. Komonosky, Champlin, all of Minn.

[73] Assignee: Vic Manufacturing, Minneapolis, Minn.

[21] Appl. No.: 719,261

[22] Filed: Aug. 5, 1991

[51] Int. Cl.$^5$ .............................................. B01D 53/04
[52] U.S. Cl. .................................... 55/97; 55/74; 55/180; 55/257.1; 55/387; 8/141; 8/142; 68/18 F
[58] Field of Search .............. 8/141, 142, 158; 55/74, 55/97, 179, 180, 257.1, 387; 68/12.08, 18 R, 18 C, 18 D, 18 F, 210

[56] References Cited

U.S. PATENT DOCUMENTS

| | | | |
|---|---|---|---|
| 2,198,412 | 4/1940 | McDonald | 8/142 X |
| 2,438,868 | 3/1948 | Trier | 55/257.1 |
| 2,656,696 | 10/1953 | McDonald | 8/142 X |
| 2,910,137 | 10/1959 | Victor | 8/141 |
| 3,104,936 | 9/1963 | Führing | 8/141 X |
| 3,250,097 | 5/1966 | Czech | 68/18 R X |
| 3,428,412 | 2/1969 | Gilbert et al. | 8/142 |
| 3,617,208 | 11/1971 | Burger | 8/142 |
| 3,728,074 | 4/1973 | Victor | 8/142 |
| 3,807,948 | 4/1974 | Moore | 8/142 |
| 3,883,325 | 5/1975 | Führing et al. | 55/179 X |
| 3,937,043 | 2/1976 | Hughes et al. | 68/18 R |
| 4,045,174 | 8/1977 | Führing et al. | 8/142 |
| 4,074,984 | 2/1978 | Führing | 55/179 X |
| 4,154,002 | 5/1979 | Moore | 8/142 X |
| 4,583,985 | 4/1986 | Preisegger | 8/141 X |
| 4,622,039 | 11/1986 | Merenda | 8/142 |
| 4,650,493 | 3/1987 | Pahlsson et al. | 8/142 |
| 4,920,768 | 5/1990 | Cares et al. | 68/18 R |

Primary Examiner—Robert Spitzer

[57] ABSTRACT

Method and apparatus are disclosed for capturing solvent vapors from around the access opening of dry cleaning apparatus. The method and apparatus include the use of one or more collars positioned adjacent to the access opening. Vapors from the access opening are drawn through apertures in the collar(s) by suction. Condensed water is received in a reservoir and then atomized.

13 Claims, 5 Drawing Sheets

CONTROLLING SOLVENT VAPORS IN DRY CLEANING APPARATUS

FIELD OF THE INVENTION

This invention relates to dry cleaning processes and apparatus. More particularly, this invention relates to apparatus and techniques for controlling solvent vapors in dry cleaning processes.

BACKGROUND OF THE INVENTION

Various mechanisms have long been utilized to clean textiles with the use of non-aqueous cleaning solvents. These devices have generally been called "dry cleaning" machines and are comprised of a rotating drum into which garments are placed. A variety of mechanisms for introducing and removing the cleaning solvent may be used. During the cleaning process the cleaning solvent is "contaminated" with various substances including dirt and grime, "spotting" substances and body oils. In addition, a measurable amount of water is introduced to the cleaning process through several sources, including moisture that may be naturally contained in the textiles, water added during the spotting process, and humidity in the air in the machine. This water mixes with the cleaning solvent, or its vapors, during the cleaning cycle.

Following the cleaning cycle, the textiles are dried by draining off the liquid solvents and subsequently heating the garments to vaporize solvents contained in them. This vaporized solvent, containing some water, is then condensed using a cooling process. A liquid mixture of cleaning solvent and water is obtained. A separating device on the dry cleaning machine is then employed to separate the solvent from the water resulting from both of these processes so that the solvent may be reused. The remaining water is unfortunately contaminated with a certain amount of cleaning solvent that was not able to be separated out. As is noted in U.S. Pat. Nos. 2,438,868 and 3,104,936, the separation process, while subject to improvement is not perfect.

The contaminated water recovered from the dry cleaner operation must be disposed of. Historically, it was simply dumped into a sewage system. However, with the advent of stricter environmental standards, this is now often prohibited.

It has also been known to evaporate the contaminated water through boiling since the small amounts of cleaning solvent thus vaporized into the work environment may be within applicable air quality standards. However, this boiling method requires a complex and expensive boiler mechanism, requires the expenditure of fuel resources, poses safety problems, and creates additional emissions problems if a fossil fuel is used to fire the boiler.

Apparatus and techniques to overcome these severe environmental and economic restrictions through a novel, effective and safe method of disposal of the contaminated water are described in commonly assigned copending application Ser. No. 07/719,269 filed on Aug. 5, 1991, incorporated herein by reference.

Another problem associated with the use of conventional dry cleaning apparatus is evident after the cleaning cycle is complete. When the access door is opened to permit removal of the cleaned garments or textiles, solvent vapors in the cleaning drum can escape through the access door into the surrounding environment and particularly into the area where operating personnel are working. This presents environmental and safety problems as well as presenting offensive odors to the work place.

The present invention provides apparatus and techniques for eliminating or reducing escape of the solvent vapors.

SUMMARY OF THE PRESENT INVENTION

In accordance with the present invention there is provided apparatus and techniques for controlling solvent vapors in dry cleaning apparatus and processes. The apparatus and techniques described herein are effective and safe for capturing and removing solvent vapors which would otherwise escape through the door opening of conventional dry cleaning machines.

The apparatus of this invention, on one embodiment, comprises:

(a) a collar member disposed adjacent the lower portion of the access door opening of the dry cleaning machines, wherein the collar member includes aperature means through which gases may pass; and (b) suction means operatively connected to the aperature means for drawing air through the aperature means when the door is opened, whereby solvent vapors exiting the door opening may be drawn through the aperature means in the collar member.

In a preferred embodiment there is a collar member disposed adjacent each of the upper and lower edges of the access opening so that solvent vapors may be captured from both upper and lower portions of the access opening.

Other advantages of the apparatus of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
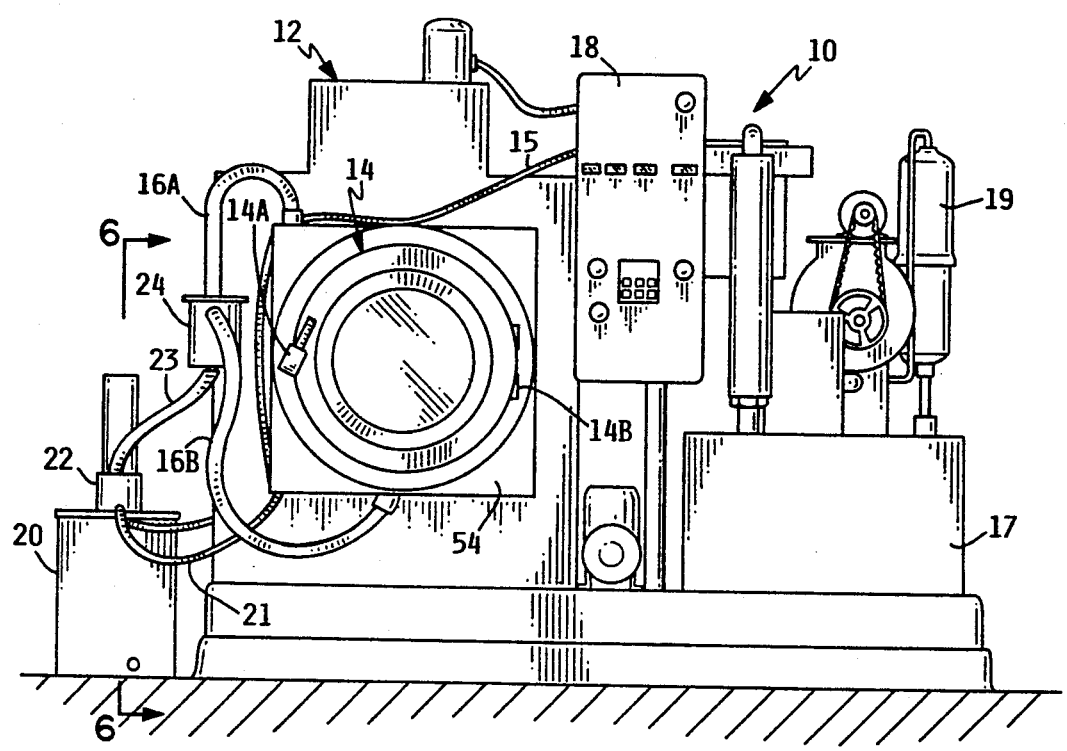
FIG. 1 is a front elevational view of dry cleaning apparatus which includes various embodiments of the present invention.

In FIG. 1 there is shown a front elevational view of dry cleaning apparatus 10 which embodies improvements of the present invention. The dry cleaning apparatus comprises a washer member 12 which includes a front access opening (normally in a generally vertical plane). A door 14 covers the access opening and may be moved between open and closed positions. The door includes a lever 14A on one side and hinge 14B on the opposite side edge to movably fasten the door 14 to the washer member 12.

As is generally shown in FIG. 1, dry cleaning apparatus 10 includes a control box 18 having various devices for controlling the apparatus. Included in box 18 would be controls for the general operation of the cleaning apparatus, as well as flow controls for moving the cleaning solvent through various portions of the cleaning apparatus where it is employed for cleaning as well as being purified for reuse. Carbon filter 19 is used to help purify the cleaning solvent. An evaporative still 17 is provided for purifying the cleaning solvent. Line 15 carries a supply of compressed air to a pneumatic door handle 14A, and line 21 carries a supply of compressed air to operate an atomizer 40 as will be described in detail later.

During the dry cleaning process, clothes or other textiles to be cleaned are placed through the access opening into a rotating drum of the washer member 12, after which the desired dry cleaning solvents are pumped into the washer member. There may be more than one dry cleaning solvent used in a conventional dry cleaning process. A common solvent which is used is perchloroethylene which is heavier than water.

It is customary to pre-spot the clothing before they are placed in the dry cleaning apparatus. They are then placed into the cleaner drum. After the clothes have gone through the wash cycle, with the textiles in the drum being tumbled through a bath of solvent, the machine goes into a drying cycle. During this drying cycle, air is used as follows:

(1) The cleaning solvent liquid is drawn off for recycling and reuse. Before entering the washer shell or member, the air passes over a heating coil 4 shown schematically in FIG. 8. The resulting hot air is directed into the washer shell where it mixes with the wet clothes and begins to vaporize the solvent(s).

Figure 8:
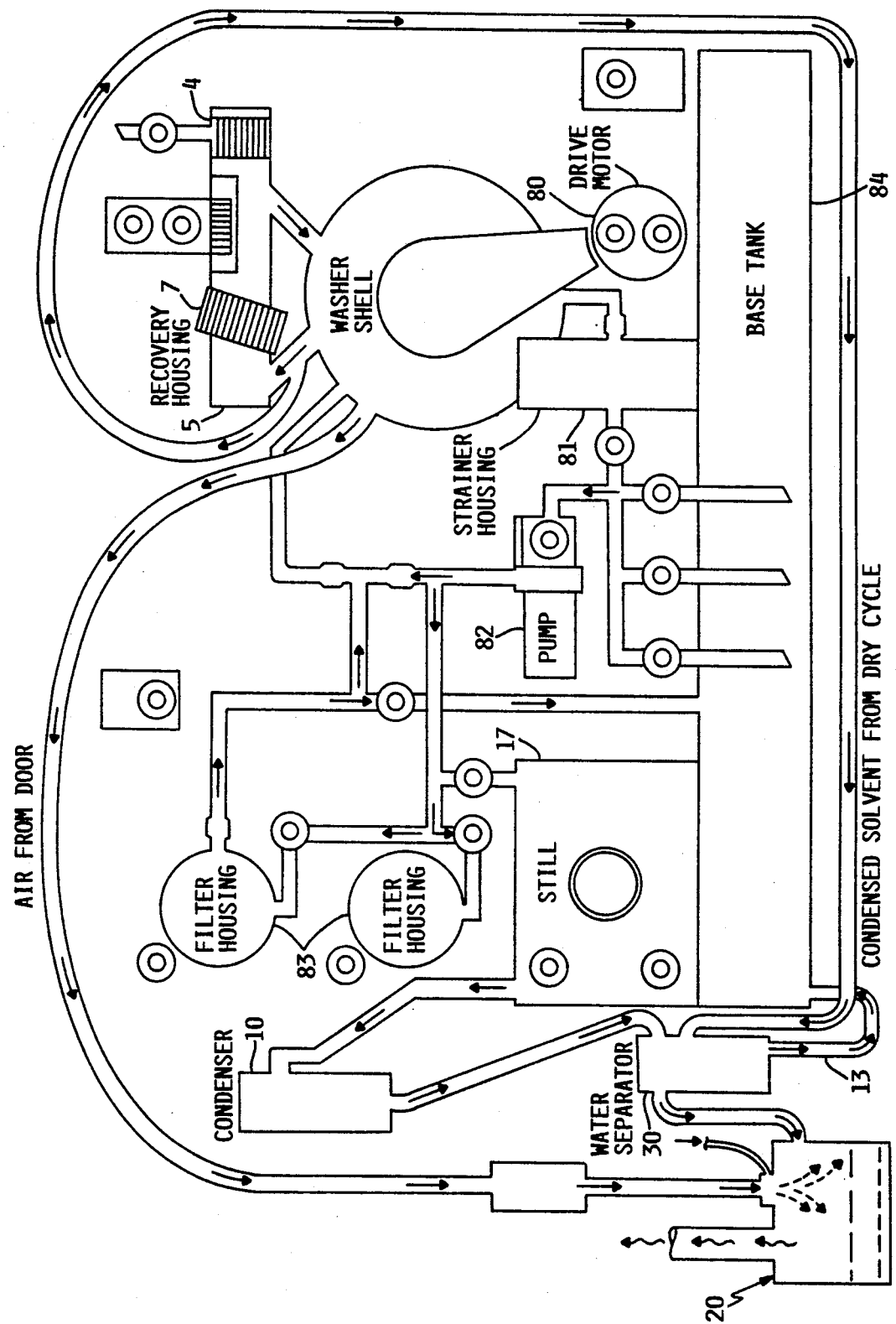
FIG. 8 is a schematic diagram illustrating dry cleaning apparatus which embodies apparatus of this invention.

(2) The solvent-laden air is taken out of the washer shell and passed into a recovery housing 5 shown schematically in FIG. 8 where it passes over a condensing coil 7. This process condenses the vaporized solvent(s) back into a liquid. This liquid solvent is then captured in a trough inside the recovery housing and is drained to a water separator 30 shown schematically in FIG. 8 and in perspective in FIG. 2 and cross section in FIG. 3. In the water separator, the solvent(s) and water are separated through settling, with the solvent(s) being returned to the main solvent base tank and the waste water drained to a reservoir or a container 20 shown in FIGS. 1 and 6. This process continues until the air passing over the clothes has reached a pre-determined temperature (normally about 125 degrees F.). At this point the clothes are deemed to be dry.

When the access door 14 is opened to permit removal of the clothes from the drum, the air in the washer still contains some solvent vapor. In order to prevent or minimize escape of this relatively undiluted solvent vapor into the surrounding environment and particularly the area where operating personnel are working, the apparatus preferably includes means for at least partially capturing such solvent vapor adjacent the access opening. For this purpose there is preferably included a collar member adjacent the lower portion of the access opening, which collar member includes aperture means for drawing air and solvent vapor from around the access opening and into the collar member. Suction means is operably connected to the collar member for drawing the solvent vapor away from the access opening. In a more preferred embodiment there is a collar member adjacent the upper portion of the access opening in a similar manner as just described. The fan means used to draw off vapor from around the access opening is used to supply a flow of air through the atomization system for the reasons, and in the manner described later.

Figure 4:
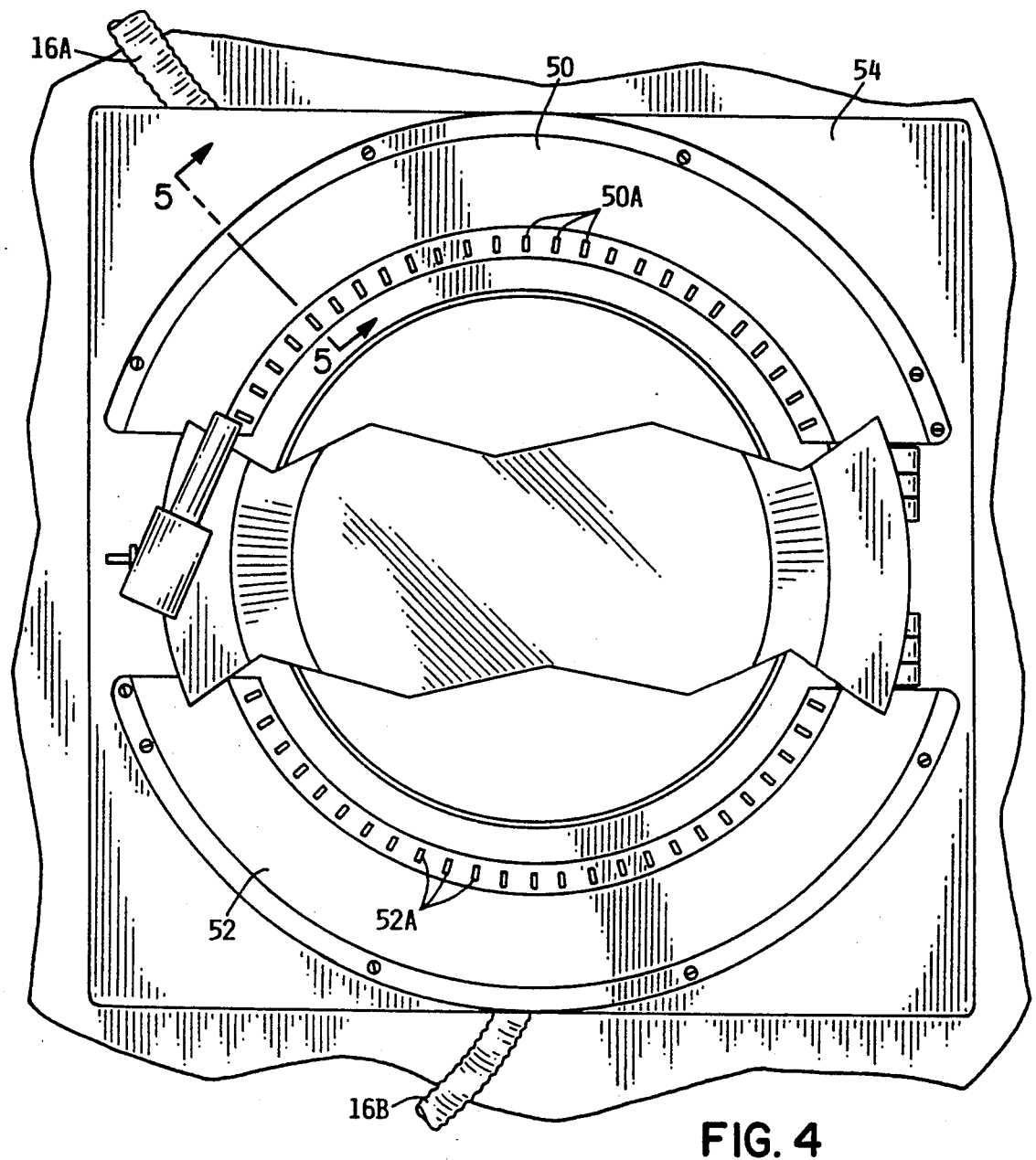
FIG. 4 is a front elevational, partially cut-away, view of the access door area of dry cleaning apparatus.
Figure 5:
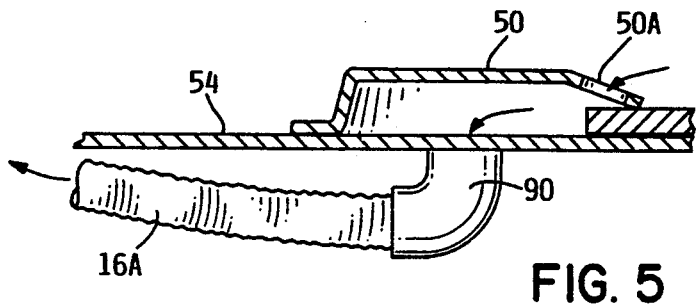
FIG. 5 is a cross-sectional view taken along line 5—5 in FIG. 4.
Figure 6:
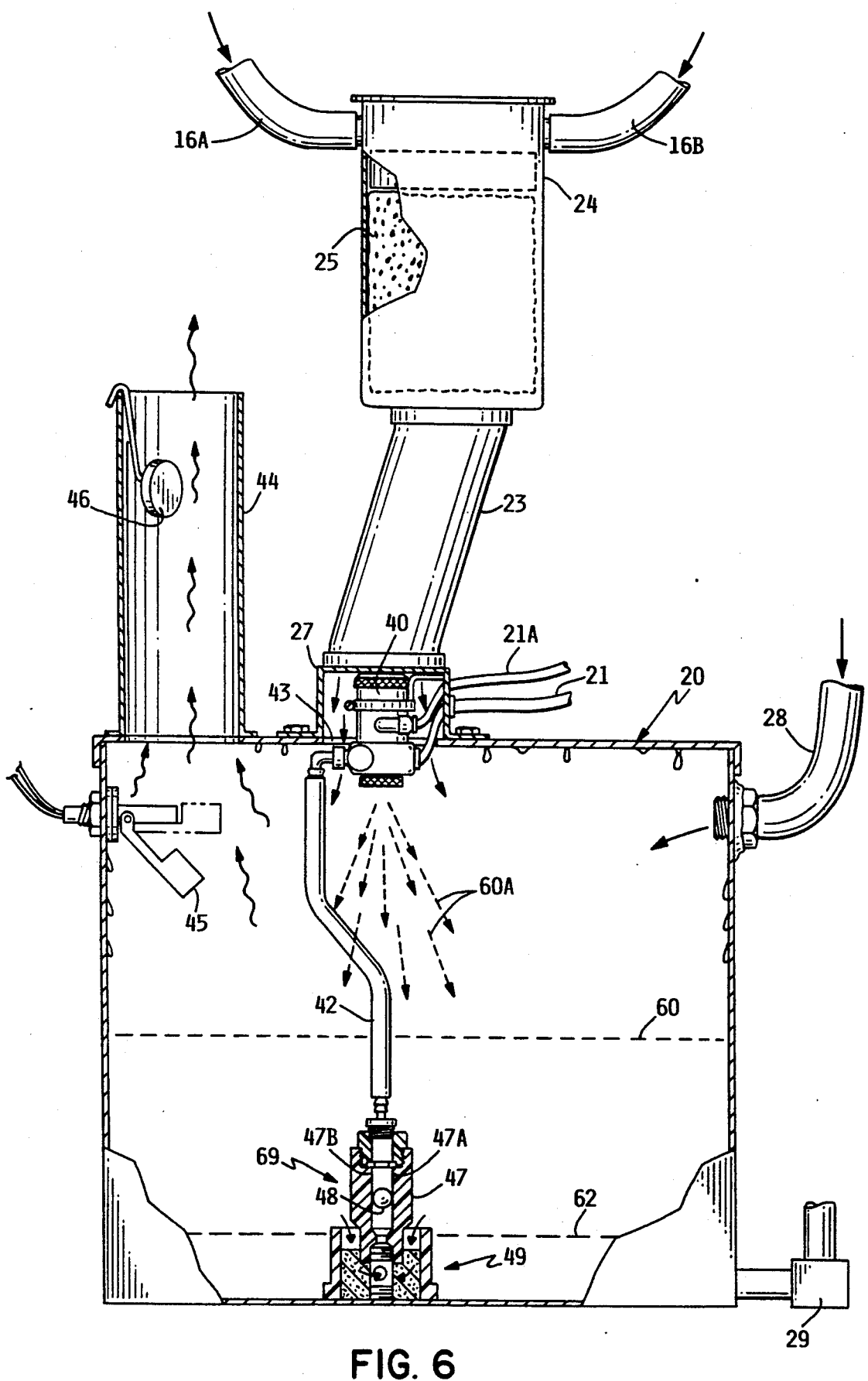
FIG. 6 is a cross-sectional view of a preferred embodiment of atomizing apparatus used in the practice of this invention, taken along 6—6 in FIG. 1.

As partially illustrated in FIG. 1, there are suction lines 16A and 16B which are operably connected to the upper and lower collar members, 50 and 52 respectively. The suction lines are connected to fan means 24 for creating the appropriate suction to draw the solvent vapors through the collar members. This air flow at the output end of fan means 24 is directed through line 23, past atomizer 40 and into container 20. The upper and lower collar members are illustrated in more detail in FIGS. 4 and 5. Thus, there is shown an upper collar member 50 and a lower collar member 52 which are arc-shaped and which are secured to a front plate 54 on the front wall of the washer member. Collar 50 includes a plurality of apertures 50A and collar 52 includes a plurality of apertures 52A. The number, form and location of these apertures may vary to provide an appropriate path of evacuation for solvent vapors escaping when door 14 is open. Preferably the collar members are curbed in a manner that positions their evacuation apertures as operably close to the access opening as possible, as illustrated in FIG. 5. As shown in FIG. 6, solvent vapors are drawn through the apertures 50A in hollow collar member 50. The vapors then exit the collar member through line 16A. Similarly, solvent vapors are also drawn through apertures 52A in hollow collar member 52, and then exit the collar member through line 16B. In the preferred embodiment, 16A and 16B are attached to collars 50 and 52, respectively, by an elbow 90 which is mounted through openings in plate 54 as shown in FIG. 5. Lines 16A and 16B are directed through a filter bag 25 as shown in FIG. 6. Filter bag 25 is disposable and contains an appropriate chemical to remove solvent vapor from the air passing there through. In the preferred embodiment, this material is granular charcoal. Other filter types may also be used, and may be positioned at any number of possible locations between the collars 50 and 52, and container 20. The use and positioning of lower collar member 52 is particularly advantageous because it is below the access opening where the heavier than air solvent vapors may tend to migrate. Other appropriate shapes for the collar members may be used if desired so long as they are capable of capturing solvent vapors exiting from the access opening in the washer member when the door is in the open position.

Figure 2:
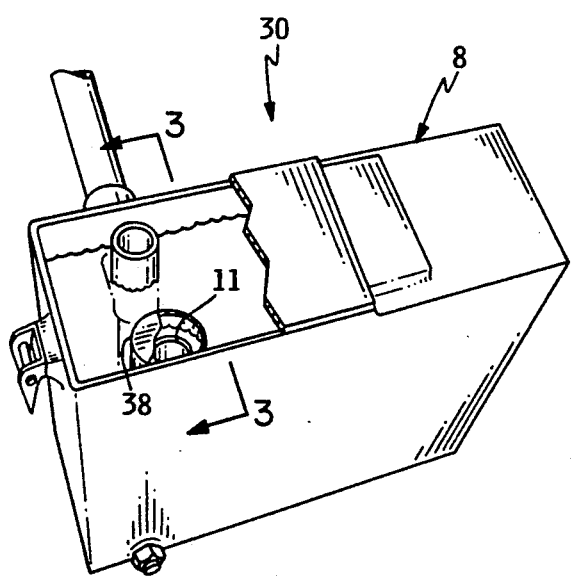
FIG. 2 is a perspective view of a water separator which is normally included in conventional dry cleaning apparatus.
Figure 3:
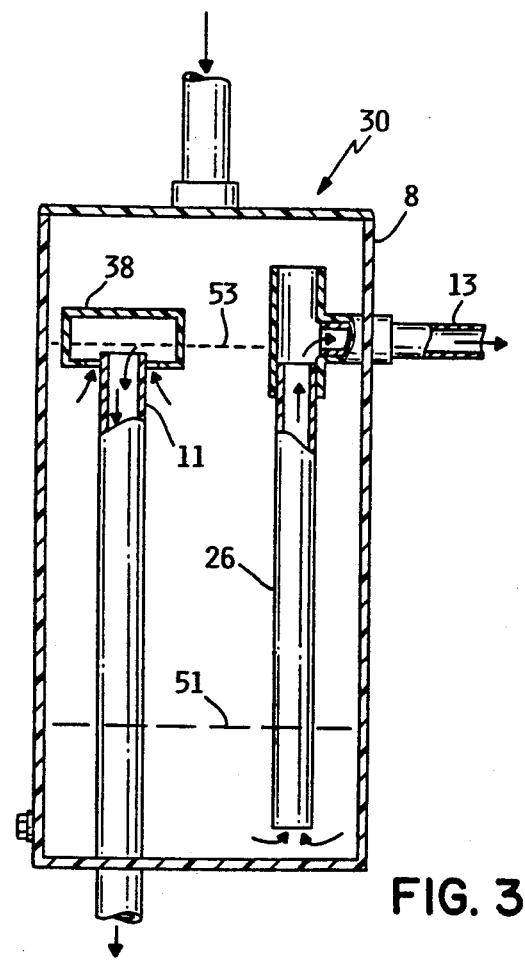
FIG. 3 is a cross-sectional view of the water separator, taken along the line 3—3 in FIG. 2.

FIGS. 2 and 3 show a typical water separator 30 which is normally included in conventional dry cleaning machines. Separator 30 includes a settling reservoir 8 which is intended to hold the water and cleaning solvent which are drawn from two functions of the cleaning process. One function is the vapor recovery process which takes place in recovery housing 5 shown schematically in FIG. 8 in which cleaning solvent and water vapors are condensed out as part of the drying cycle. The second function is the condensing process. In the condensing process, a still 17, shown schematically in FIG. 8, is used to clean grime laden cleaning solvent. The cleaning solvent is boiled in still 17. Vapors from this boiling are routed to a condenser 10 (shown schematically in FIG. 8) where cold water coils, or other appropriate cooling means, are used to precipitate out liquid solvent and water. The water from recovery housing 5 and condenser 10 is then directed to water separator 30. Because the cleaning solvent, such as perchloroethylene, is slightly soluble in water, when allowed to stand the water and solvent tend to separate. The solvent, if heavier than water will settle to a lower strata 51 in settling reservoir 8, while the water will settle in a strata 53 above the solvent. A drain pipe 11 is provided in reservoir 8 through which the water drains off as the water level reaches the top lip of pipe 11. A collar 38 shown in FIGS. 2 and 3 and having openings in its base covers pipe 11 and allows water into it and over the edge of pipe 11. Pipe 11 is operably connected to inlet pipe 28 of reservoir 20 of the atomizing system shown in FIG. 6. The solvent, such as perchloroethylene, in the lower portion of settling reservoir 8 is drawn up a pipe 26 having its lower end near the bottom of reservoir 8. It can then be drained off through an appropriate drain line 13 (shown schematically in FIG. 4) to be reclaimed and reused in the dry cleaner.

FIG. 6 is a cross-sectional view showing a preferred atomizing apparatus which is useful in the present invention. Condensate water which results from vapor recovery in recovery housing 5 and condensate recovery in condenser 10 in the dry cleaning process proceeds through water separator 30 into container 20 via line 28. Also contained in container 20 will be liquid from two other sources. One will be atomized droplets from atomizer 40 which condense out and drop into container 20. The second will be wall condensate which accumulates on the interior of container 20 due to atmospheric conditions therein. All of this condensate water includes a small amount of dry cleaning solvent(s) such as perchloroethylene. Because the dry cleaning solvent(s) is not completely soluble in water, some of it may physically separate from the water in the container 20. However, the volumes of solvent will be very small compared to the volume of water. Because the dry cleaning solvent(s) 62 is heavier than water 60, the solvent 62 will settle out upon standing. Thus, the water 60 will float on top of solvent 62. The separated solvent 62 in container 20 may be drained off through drain 29 for re-use in the dry cleaning process, if desired.

Even though the cleaning solvent, such as perchloroethylene, tends to settle out of the waste water contained in container 20, water 60 typically still contains a small amount of solvent therein which has not settled out. Because of existing and contemplated government regulations, it is often not possible to simply discard water 60 with a stated level of retained solvent into a sewer line.

In order to safely and effectively dispose of water 60 in a manner consistent with government regulations, the present invention provides means for atomizing water 60 so that it may be dispersed into the atmosphere in a safe manner. Thus, the apparatus includes atomizer 40 positioned at the top of container 20. Atomizer 40 may be of any number of commercially available designs that atomize liquid into a fine mist. They may or may not have cleaning lines to remove particulate matter from the atomizing nozzle. In the preferred embodiment, such a cleaning device is included. An atomizer (Part No. 156.330.30.03) with cleanout pin (Part No. 015.601.30.05) manufactured by Lechler, is very useable in the apparatus of this invention. These atomizers operate over a fairly broad range of pressures. Their basic operation, as in the preferred embodiment, is to force liquid through them. A stream of pressurized gas, e.g. air, is mixed with the water supply to break the water into minute droplets, i.e. atomization, which can remain suspended in air, and which can be moved about by moving the air containing them. A source of compressed gas (e.g., air at 80 psi) is fed to the atomizing apparatus through line 21. Compressed air may also be fed to the atomizer through line 21A to effect a self-cleaning of the nozzle. As the compressed air passes through the atomizer 40, water 60 is drawn upwardly through aspirator tube 42 into atomizer 40 where it is atomized and directed downwardly and back into container 20 as shown by lines 60A. It has been found that directing the atomized liquid 60A downwardly, instead of upwardly, and over a catching reservoir beneath the atomizer is important since the reservoir catches unevaporated droplets that are so large that they would otherwise settle or condense out in nearby areas where it would not be recovered. Other means (e.g. a pump, or gravity feed if reservoir is above the atomizer) may also be used for feeding water 60 into atomizer 40.

Once the water 60 has been atomized into a spray of minute droplets 60A, it is desirable to move the air-droplet aerosol into the surrounding atmosphere. This is accompanied by providing a continuous air flow into and out of container 20. In the preferred embodiment this air flow is provided by the flow created by fan 24 which draws air through lines 16A and 16B. Line 23 carries air under the pressure of fan 24 into housing 27 sealably attached to the top of container 20. Contained in housing 27 is atomizer 40. The interior of housing 27 connects with the interior of container 20 through an opening 43 in the top of container 20. Thus as is shown in FIG. 6 a route is provided for a forced flow of air to intermix with the atomized vapor 60A and carry it out of container 20 for mixing with the atmosphere. The upper wall or top of container 20 includes an outlet port or stack 44 through which the atomized water, now mixed with surrounding air, may exit to the atmosphere. Other shapes and positions of port 44 may also be used. If desired, a deodorant means, such as solid deodorant member 46, may be suspended in the outlet port to deodorize the vented air. As another alternative, a liquid deodorant may be added to the water 60 within the container for the same purpose. Also, a liquid or a gaseous deodorant may be added at other locations in the path of flow of water 60 or atomized water 60A to deodorize it. The atomized water exits to the atmosphere in a manner such that the concentration of the solvent in such water is very low and unobjectionable in light of existing toxicity standards. It has been found that approximately 1 liter or more of contaminate water per hour can be disposed of using the preferred embodiment.

Figure 7:
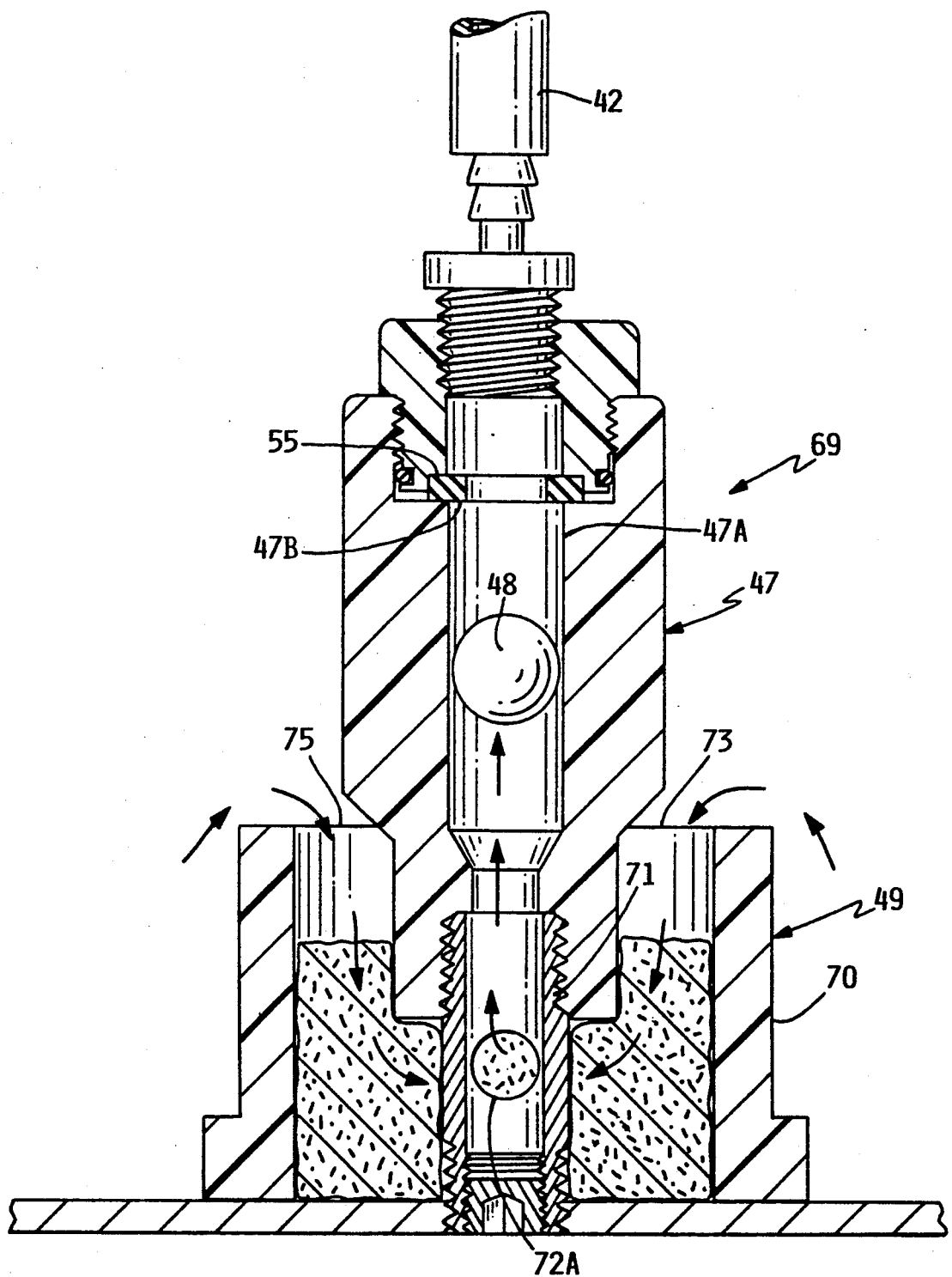
FIG. 7 is an enlarged view of the ball valve and its filter assembly.

As is shown in FIGS. 6 and 7 the lower end of the aspirator tube 42 includes a unique ball valve 69 which is intended to permit filtered water 60 to pass upwardly through tube 42 to atomizer 40 but which is also capable of preventing separated solvent 62 from being drawn upwardly through tube 42 to the atomizer. The latter operation would not be desirable because the condensed solvent is more desirably recovered and drained off for reuse, but, more importantly, because pure solvent atomized into the atmosphere would most likely exceed environmental standards. It has been found in the preferred embodiment that so little solvent separates out in the bottom of the container 20, that, under normal operation, it is not likely to close. This could, however, happen if the functions in cleaner apparatus 10 that are operably connected to feed line 28 were to malfunction, e.g. overflow, and feed large amounts of cleaning solvent into line 28. Ball valve 69 comprises a housing 47 having an internal conduit 47A therein which operably communicates with the lower end of tube 42. Housing 47 is part of a commercially available ¼ inch check valve manufactured by Hayward. As originally designed, a ball contained within housing 47 would move to close the valve when flow in the valve reversed. This function was not desired in the present application wherein a more refined phenomenon, i.e. relative movement of two liquids having differing specific gravities, was to serve as a triggering mechanism to open and close the valve. To accomplish this more particular objective, the commercially provided ball in housing 47 was replaced with a nylon ball 48 having a specific gravity of 1.17 (with water being 1.0). It has a specific gravity lower than the solvent and higher than water so that when water is present in the housing 47 the ball sinks in the water, rather than riding on its surface, and is not buoyed upwardly to block conduit 47A. However, if the level of separated solvent 62 in container 20 is too high, i.e. reaches a level near the upper end of conduit 47A, then ball 48 floats on the upper surface of the solvent 62 until the upper surface of ball 48 contacts surface 47B, eventually blocking access to conduit 47A. In the preferred embodiment, surface 47B is an annular opening in a viton rubber disk 55. In this manner, the valve system enables water 60 to proceed upwardly to the atomizer, but the valve will become closed in the event that the level of separated solvent raises the upper surface of ball 48 into closing contact with surface 47B. In the embodiment where perchloroethylene is the cleaning solvent, a ball having a specific gravity of 1.17 is utilized.

Even though atomizer 40 has a self cleaning capability, it can become contaminated with solid particles which find their way to it. To further guard against this, a screening mechanism 49 surrounds the inlet opening of conduit 47A. As is shown in FIG. 7, screening mechanism 49 consists of a housing 70, the base of which rests against the bottom of container 20. The top of housing 70 is open. Mounted within housing 70, which has a cylindrical interior opening 75, is a nipple 71. In the preferred embodiment nipple 71 is screwed into the base of housing 70, with the opposite end being threadably screwed into the base of ball valve 69, operably connecting with conduit 47A. Two holes are placed in the opposing side walls of nipple 71. Hole 72A is visible in FIG. 7. Filling the cylindrical opening of housing 70 is an annular filter ring 73. In the preferred embodiment ring 73 is polyurethane foam. The pore size of ring 73 is such that it cannot pass particles having a diameter any larger than that permitted for passage through atomizer 40, which sizes are well known in the commercial art of atomizers. Thus, water to drawn into ball valve 69 through conduit 47A, flows into the cylindrical opening 75 of housing 70. There it is filtered by filter ring 73 before passing through hole 72A and its opposed counterpart in nipple 71. The water then flows into conduit 47A.

In the event that the water level within container 20 becomes too high, float member 45 will become raised and activate a switch to shut down the drying machine. A trouble light or other warning would alert the operator who can remedy the oversupply of solvent in container 20, possibly by merely draining solvent from it. This situation most likely would arise if for a generally unforeseen reason, the level of solvent in container 20 did in fact force the continued closure of valve 69, and the supply of water through line 28 was such as to fill container 20 before the solvent was sufficiently drained off to open valve 69. While in the preferred embodiment ball 48 is round, other shapes for "ball" 48 may be used with a matching contour replacing surface 47B to effectuate closure of the valve.

FIG. 8 is a schematic diagram of dry cleaning apparatus which embodies the improvements and techniques of the present invention. Various of the features of the schematic process have been previously identified and described. Others are here described. The washer drive is driven by the drive motor 80. A strainer housing 81 is provided to remove large debris such as buttons, from the solvent. At least one pump 82 is provided for moving the solvent through the system. Condensed solvent and water from the dry cycle is fed through lines to the water separator 30. Two filter housings 83 are used to filter the recycled cleaning solvent before it is reused. A base tank 84 is used to store the supply of cleaning solvent which is used in the cleaning apparatus. Other variants are possible without departing from the scope of this invention. In general, they would include the use of the invention on devices having access openings and containing contaminating gases where it is desirable to at least partially draw such gasses away from the openings for disposal.

What is claimed is:

1. A method for capturing solvent vapors from around the access opening of dry cleaning apparatus, wherein said access opening includes upper and lower portions, the method comprising the steps of:
   (a) providing a collar member which includes aperture means through which gases may pass;
   (b) providing suction means operatively connected to said aperture means for drawing air through said aperture means;
   (c) disposing said collar member adjacent said lower portion of said access opening;
   (d) providing condenser means for condensing water; wherein said water includes an amount of solvent, said solvent being heavier than water;
   (e) providing reservoir means for receiving and holding said water; wherein said reservoir means comprises a container having an inlet port for receiving said water and an outlet port;
   (f) providing atomizer means operatively associated with said reservoir for atomizing said water;
   (g) providing feed means for feeding said water to said atomizer means; wherein said feed means comprises aspirator means; wherein said aspirator means comprises an elongated tube having upper and lower ends, wherein said upper end is operably connected to said atomizer means; wherein said aspirator means further includes valve means attached to said lower end of said tube; wherein said valve means is adapted to allow water to flow into said tube and is further adapted to close in the event the level of said solvent in said reservoir exceeds a predetermined level;
   (h) drawing solvent vapors from said access opening through said aperture means to said condenser means;

(i) atomizing said water and venting through said outlet port.

2. A method in accordance with claim 1, wherein two said collar members are provided, wherein one of said collar members is disposed adjacent said lower portion of said access opening and the other of said collar members is disposed adjacent said upper portion of said access opening.

3. A method in accordance with claim 1, further comprising the step of passing said solvent vapors through filter means.

4. A method in accordance with claim 1, wherein said collar member is hollow and includes a plurality of apertures.

5. Dry cleaning apparatus of the type including a vessel having an access opening which is disposed in a generally vertical plane and a door for normally closing said opening during operation of said apparatus, wherein said opening includes upper and lower portions, wherein clothes to be cleaned are placed into said vessel and cleaned with a solvent, wherein the improvement comprises:
   (a) a collar member disposed adjacent said lower portion of said opening, wherein said collar member includes aperture means through which gases may pass;
   (b) suction means operatively connected to said aperture means for drawings air through said aperture means when said door is opened;
   (c) condenser means for condensing water; wherein said water includes an opening of solvent, said solvent being heavier than water;
   (d) reservoir means for receiving and holding said water; wherein said reservoir comprises a container having an inlet port for receiving said water and an outlet port;
   (e) atomizer means operatively associated with said reservoir for atomizing said water;
   (f) feed means for feeding said water to said atomizer means; wherein said feed means comprises aspirator means; wherein said aspirator means comprises an elongated tube having upper and lower ends, wherein said upper end is operably connected to said atomizer means; wherein said aspirator means further includes valve means attached to said lower end of said tube; wherein said valve means is adapted to allow water to flow into said tube and is further adapted to close in the event the level of said solvent in said reservoir exceeds a predetermined level;

whereby solvent vapors exiting said access opening may be drawn through said aperture means in said collar member; and wherein atomized water is vented through said outlet port.

6. The improvement in accordance with claim 5, wherein said suction means comprises a fan.

7. The improvement in accordance with claim 5, further comprising filter means for filtering said solvent vapors from said air.

8. The improvement in accordance with claim 5, wherein there are at least two said collar members, wherein one said collar member at least partially circumscribes said lower portion of said access opening and another said collar member at least partially circumscribes said upper portion of said access opening.

9. The improvement in accordance with claim 5, wherein said valve means comprises (a) a housing having a conduit therethrough, which communicates with said lower end of said tube, and (b) a float member within said housing, wherein said float member has a specific gravity greater than water such that water is permitted to flow through said conduit and into said tube, and wherein said float member blocks access to said conduit when the amount of said solvent which has separated from said water exceeds a predetermined level.

10. The improvement in accordance with claim 9, where-in said container further includes drain means for draining separated solvent from said container.

11. The improvement in accordance with claim 9, further comprising deodorizing means adjacent said outlet port for emitting deodorant into air passing through said outlet port.

12. The improvement in accordance with claim 5, wherein said air drawn through said collar member is directed past said atomizer means such that atomized water is carried by said air out of said reservoir.

13. The improvement in accordance with claim 5, wherein said collar member comprises an arc-shaped hollow body.

* * * * *